(12) United States Patent
Hollander

(10) Patent No.: US 8,860,312 B2
(45) Date of Patent: Oct. 14, 2014

(54) LIGHT EMITTING DIODES DRIVEN BY HIGH INTENSITY DISCHARGE BALLAST

(75) Inventor: Jonathan Hollander, Petach Tikva (IL)

(73) Assignee: Metrolight Ltd., Netanya (IL)

( * ) Notice: Subject to any disclaimer, the term of this patent is extended or adjusted under 35 U.S.C. 154(b) by 11 days.

(21) Appl. No.: 13/696,086

(22) PCT Filed: May 10, 2010

(86) PCT No.: PCT/IB2010/052046
§ 371 (c)(1),
(2), (4) Date: Nov. 27, 2012

(87) PCT Pub. No.: WO2011/141768
PCT Pub. Date: Nov. 17, 2011

(65) Prior Publication Data
US 2013/0234596 A1 Sep. 12, 2013

(51) Int. Cl.
| | |
|---|---|
| H05B 39/10 | (2006.01) |
| H05B 41/46 | (2006.01) |
| H05B 33/08 | (2006.01) |
| H05B 35/00 | (2006.01) |
| H05B 41/288 | (2006.01) |

(52) U.S. Cl.
CPC ............. *H05B 41/46* (2013.01); *Y02B 20/202* (2013.01); *H05B 33/0809* (2013.01); *H05B 35/00* (2013.01); *H05B 41/2885* (2013.01)
USPC ................. 315/90; 315/88; 315/92; 315/178; 315/179

(58) Field of Classification Search
None
See application file for complete search history.

(56) References Cited

U.S. PATENT DOCUMENTS

| | | | | |
|---|---|---|---|---|
| 7,282,869 | B1* | 10/2007 | Mayer et al. | 315/290 |
| 2003/0160573 | A1* | 8/2003 | Johnson | 315/291 |
| 2006/0015273 | A1 | 1/2006 | Orozco | |
| 2007/0205729 | A1 | 9/2007 | Garbowicz | |
| 2008/0191628 | A1* | 8/2008 | Marques et al. | 315/86 |
| 2010/0033095 | A1 | 2/2010 | Sadwick | |
| 2010/0164389 | A1* | 7/2010 | Dellian et al. | 315/182 |

FOREIGN PATENT DOCUMENTS

| | | |
|---|---|---|
| EP | 0726554 A1 | 8/1996 |
| WO | WO2007035203 A2 | 3/2007 |

OTHER PUBLICATIONS

PCT International Search Report, App No. PCT/IB 10/52046, Applicant Johnathan Hollander, Aug. 25, 2010.

(Continued)

*Primary Examiner* — Ahn Tran
(74) *Attorney, Agent, or Firm* — Dr. Hanan Farber Patent Agent Ltd.

(57) ABSTRACT

A method for using an electronic ballast circuit configured to operate a high intensity discharge (HID) lamp. Multiple light emitting diodes (LEDs) are attached to the current output of the electronic ballast circuit, and current is driven from the current output to light said LEDs. Optionally, prior to driving current through the LEDs, the impedance of the current output is sensed; and the current is driven through the LEDs to light the LEDs upon detection of an impedance significantly lower than an impedance characteristic of the HID lamp. Ignition appropriate to ignite the high intensity discharge is not performed when LEDS are attached to the current output. Alternatively, a signal is provided to disconnect the LEDs during a high voltage output for ignition of the high intensity discharge (HID) lamp.

15 Claims, 5 Drawing Sheets

(56) References Cited

OTHER PUBLICATIONS

"Design of Fluorescent Lamp Ballast With PFC Using a Power Piezoelectric Transformer", Sung_Jin Choi et al, IEEE Transactions on Industrial Electronics, Vol. 52, No. 6, December 2005, p. 1573-1581.

"Shedding Light on HID Ballast Control", Tom Ribarich, Power Electronics Technology Oct. 2006, p. 34-37.

* cited by examiner

LIGHT EMITTING DIODES DRIVEN BY HIGH INTENSITY DISCHARGE BALLAST

BACKGROUND

1. Technical Field

The present invention relates to a ballast used to drive high intensity discharge lamps and, more particularly to the same HID ballast being used for a bank of interconnected light emitting diodes (LEDs).

2. Description of Related Art

A high-intensity discharge (HID) lamp produces light by means of an electric arc between tungsten electrodes housed inside a fused quartz or fused alumina arc tube. The tube is filled with both gas and metal salts. The gas facilitates an initial strike or ignition of the arc. Once the arc is started, the arc heats and evaporates the metal salts forming a plasma, which greatly increases the intensity of light produced by the arc and reduces its power consumption. In typically 1 to 2 minutes, a low powered 70 W HID lamp warms up to produce its rated light output. When the HID lamp is initially cool, an ignition voltage of 4000 volts for instance is typically required to ignite the HID lamp. A re-ignition for the same lamp when the lamp is still hot, may require up to 20,000 volts for re-ignition to occur. The re-ignition when the lamp is still hot may also require a different frequency or phase characteristic for the ignition voltage to avoid risk of blowing up the HID lamp. Ballasts and lamps with hot re-strike capability are much more expensive then ballasts and lamps without hot re-strike capability.

After ignition, the HID ballast provides alternating current to the lamp at low voltage, e.g. 20-100 Volts. The physical properties of the HID lamp typically determine the operating voltage across the HID lamp.

There are two types of HID ballasts, generally termed "low" and "high" frequency ballasts. The "low frequency ballast" includes a rectifier circuit which rectifies the alternating current of the power line to direct current. The direct current is input to a circuit that performs "power factor correction" (PFC). "Power factor" is a figure of merit indicating to what extent the current and the voltage are in phase. The PFC circuit is followed by a "buck converter" providing a current source and performing a DC-DC step down conversion. The "buck converter" is followed by a full-wave bridge operating as an "inverter" outputting a low frequency, e.g. 160 Hz. square wave as input to the discharge lamp.

The "high frequency ballast" includes a rectifier circuit followed by a PFC circuit followed by either a "half bridge" or a "full bridge" circuit operated at high frequency, 100 kHz. or greater. The ignition method used in high frequency ballasts may include resonant ignition, using a high frequency sine wave or semi-resonant ignition using pulses superimposed on the peaks of a high frequency sine wave.

Modern HID ballasts are microprocessor controlled, ie. circuit blocks include transistor switches, e.g. gates of MOSFETS, which are controlled by a microprocessor.

HID lamps are widely used for illumination in public areas because of the high efficiency available, e.g 100-140 lumens/watt. However, under a drop of mains voltage, when hot re-strike is not used or unavailable, HID lamps remain off for five to ten minutes while they cool down before re-ignition. While HID lamps are in the process of cooling down, other lighting must be used which supplies sufficient light just after the mains voltage comes back on. Quartz-halogen lamps are often used for emergency lighting which are lit while the HID lamps are cooling down and waiting for re-ignition. The quartz-halogen lamps require different wiring and fixtures from the HID lamps.

Thus there is a need for and it would be advantageous to have a system and method for providing emergency lighting during the time period after a drop in mains voltage and before re-ignition of the HID lamps without requiring use of different circuitry, additional infrastructure or hot re-strike capability.

The ballast used to ignite and operate an HID lamp is very different from and should not be confused with the ballast and starter used to operate a fluorescent lamp. A fluorescent lamp uses electricity to excite mercury vapor. The excited mercury atoms produce short-wave ultraviolet light that causes a phosphor to fluoresce, producing visible light. The mercury atoms in the fluorescent tube must be ionized before an arc can "strike" within the tube. A combination filament/cathode at each end of the lamp in conjunction with a mechanical or automatic switch initially connects the filaments in series with the ballast and thereby preheat the filaments prior to striking the arc. The preheating typically takes between 2 to 3 seconds which is followed by striking of the warmed mercury vapor inside the fluorescent lamp. The strike is performed after preheating the lamp to avoid damage to the fluorescent lamp. The strike is typically performed by using another controlled circuit portion of the fluorescent ballast circuit known as a starter. The peak voltage of the pulse provided by the starter is used to strike the warmed mercury vapor inside the fluorescent lamp and is typically 1200 to 1500 volts. Light produced by the fluorescent lamp after application of the starter circuit is virtually instantaneous. A typical 40 W 48" fluorescent tube, starts at 400-650 Volts and has about a 93V working voltage. High frequency ballasts for fluorescent lamps run at 20-60 kHz. Fluorescent lamps immediately re-ignite if turned off.

BRIEF SUMMARY

According to embodiments of the present invention there is provided a lighting system including an electronic ballast circuit configured to operate a high intensity discharge (HID) lamp. The electronic ballast circuit has a current output and an impedance sensor connected to the current output. Multiple light emitting diodes (LEDs) are connected to the current output of the electronic ballast circuit. The electronic ballast circuit includes an ignition circuit configured to ignite an HID lamp (if connected) and an impedance sensor adapted to sense impedance of the current output. The ignition circuit is activated only when the sensed impedance is characteristic of the HID lamp (prior to ignition) and not characteristic of the LEDs.

The lighting system may include a second electronic ballast configured to operate a high intensity discharge (HID) lamp. The second electronic ballast shares an input of mains power with the electronic ballast. After momentary failure of the mains power, the electronic ballast and LEDs are adapted to provide emergency lighting while the high intensity discharge lamp (HID) connected to the second ballast is cooling down (and waiting for re-ignition).

The lighting system may further include a switch connected to the electronic ballast, the HID lamp and the LEDs. The switch selects either the HID lamp or the LEDs for drawing current from the ballast circuit. The switch is configured to select the LEDs for drawing current when the HID lamp is not operable such as during a time period after a momentary failure of mains electrical power. The ballast circuit is typically controlled by a microprocessor. The microprocessor may have an output configured to control the switch. Alternatively, the HID lamp and the LEDs may be driven simultaneously by the current output of the electronic ballast circuit.

According to the present invention there is provided a method for using an electronic ballast circuit configured to operate a high intensity discharge (HID) lamp. Multiple light emitting diodes (LEDs) are attached to the current output of the electronic ballast circuit. and current is driven from the current output to light said LEDs.

Optionally, prior to driving current through the LEDs, the impedance of the current output is sensed; and the current is driven through the LEDs to light the LEDs upon detection of an impedance significantly lower than an impedance characteristic of the HID lamp. Ignition appropriate to ignite the high intensity discharge lamp is not performed when LEDS are attached to the current output. Alternatively, a signal is provided to disconnect the LEDs during the high voltage output for ignition of the high intensity discharge (HID) lamp.

A rectifier and a parallel capacitor may be disposed between the current output and the LEDs. The capacitor is adapted to protect the LEDs from being damaged by an ignition pulse intended to ignite the HID lamp.

According to the present invention there is provided an electronic ballast circuit configured to operate a high intensity discharge (HID) lamp. The electronic ballast circuit includes an ignition circuit for providing an ignition pulse to ignite the HID lamp, an inverter circuit for providing current to the HID lamp and a current output configured for connection to multiple light emitting diodes (LEDS).

The electronic ballast may include an impedance sensor on the current output. The impedance sensor is configured to sense an impedance of the current output. The ignition circuit is activated when the impedance is characteristic of the LEDs and not characteristic of the HID lamp.

A microprocessor typically controls the ballast. The microprocessor may include a signal output adapted to disconnect the LEDs during the ignition pulse and to connect the LEDs only while the inverter circuit is providing the current.

The ballast circuit may include a switch connected to the HID lamp and the LEDs. The switch is configured to select the LEDs for drawing current when the HID lamp is not operable during a time period after a momentary failure of mains electrical power.

A rectifier typically a full-wave bridge rectifier may be disposed between the current output and the LEDs. A capacitor may be parallel connected between the direct current output of the rectifier and the LEDs.

BRIEF DESCRIPTION OF THE DRAWINGS

The invention is herein described, by way of example only, with reference to the accompanying drawings, wherein:

FIG. 4b shows a method according to an embodiment of the present invention for providing emergency lighting using the circuit of FIG. 4a.

FIG. 7b shows a method according to an embodiment of the present invention using the circuit of FIG. 7a.

DETAILED DESCRIPTION

Figure 1:
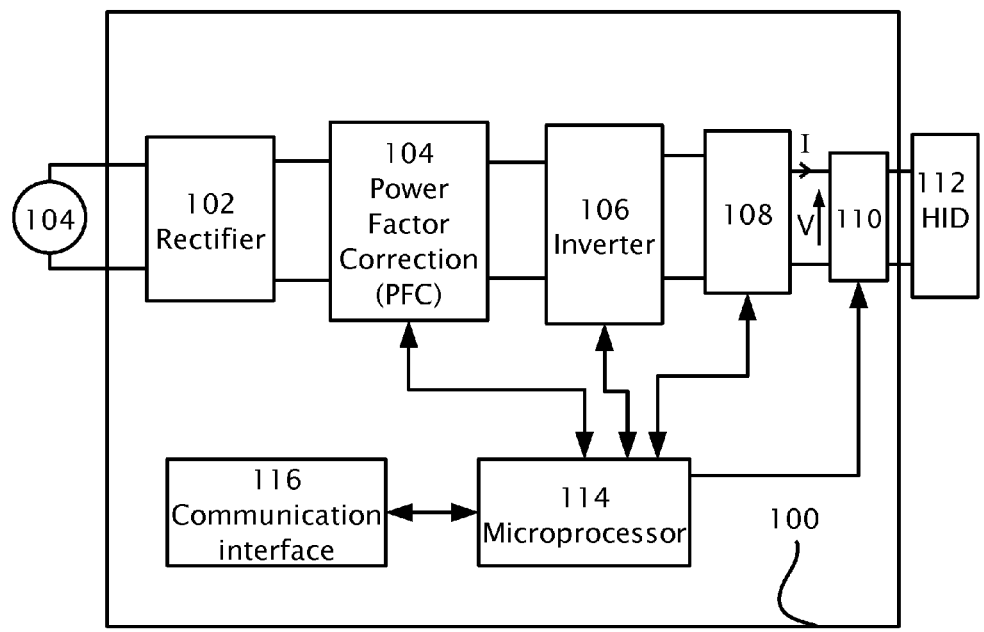
FIG. 1 shows a ballast circuit with an input connected to an alternating current (AC) power supply and an output connected to a high-intensity discharge (HID) lamp, according to an embodiment of the present invention.

Reference will now be made in detail to embodiments of the present invention, examples of which are illustrated in the accompanying drawings, wherein like reference numerals refer to the like elements throughout. The embodiments are described below to explain the present invention by referring to the figures.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, embodiments of the present invention are directed to the use of existing high intensity discharge ballasts for driving light emitting diodes. One application of the present invention is to provide emergency lighting instead of quartz-halogen lamps when hot-re-strike capability is unavailable or too expensive to implement. Other applications may be include decorative fixtures with a mixture of colors.

Referring now to the drawings, FIG. 1 shows a ballast circuit 100 with an input connected to an alternating current (AC) mains power 104 and an output connected to a high-intensity discharge (HID) lamp 112. Ballast circuit 100 typically includes a rectifier circuit 102, a power factor control circuit 104, an inverter circuit 106, and ignition circuit 108 under monitor and control of microprocessor 114. Ballast circuit 100 may be a high frequency ballast or a low frequency ballast which provides a controlled AC current output. For a high frequency ballast 100, the AC output of inverter 106 is sinusoidal with a frequency typically of 100 kHz or more. Low frequency ballast 100 outputs a square wave at about 160 Hertz. An optional communications interface 112 may be connected to microprocessor 114 to enable programming and/or reprogramming of ballast operation parameters, output current (I) and/or voltage (V) of ballast 100 for example.

Rectifier 102 has a mains electricity input 104. Input 104 is typically a 120/240 root mean square (RMS) alternating current (AC) voltage with a frequency of 60/50 Hertz. Rectifier 102 rectifies mains electricity input 104 to produce a direct current (DC) output which is input into power factor correction (PFC) circuit 104. The DC output of PFC 104 is connected to the input of inverter circuit 106. Inverter 106 may be a "half bridge" or a "full bridge" inverter circuit. Ignition circuit 108 is connected in parallel to the AC output of inverter 106. An impedance sensor (a current and/or voltage sensor) 110 is shown connected to the output to HID lamp 112.

Figure 2:
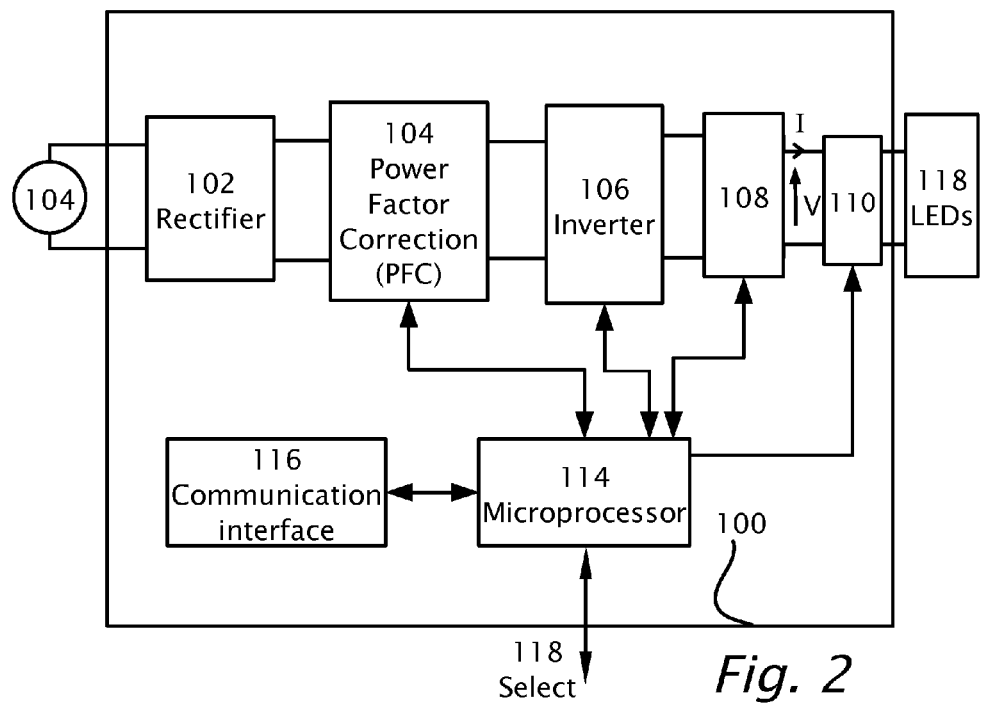
FIG. 2 shows the same ballast circuit as in FIG. 1 connected to a bank of light emitting diodes (LEDs), according to an embodiment of the present invention.

Reference is now made to FIG. 2 which shows the same ballast circuit 100 as FIG. 1 now connected to a bank of light emitting diodes, according to an embodiment of the present invention. Ballast circuit 100 typically includes rectifier circuit 102, power factor control circuit 104, inverter circuit 106, and ignition circuit 108 under monitor and control of microprocessor 114. Impedance sensor (current and/or voltage sensor) 110 is shown connected to the output to HID lamp 112. An optional select pin 118 is configured as an additional input and/or an output to/from microprocessor 114. Unlike FIG. 1, ballast 100 has its current output connected to a bank of light emitting diodes (LEDs) 118 suitably interconnected in series and/or in parallel in forward bias.

Figure 3:
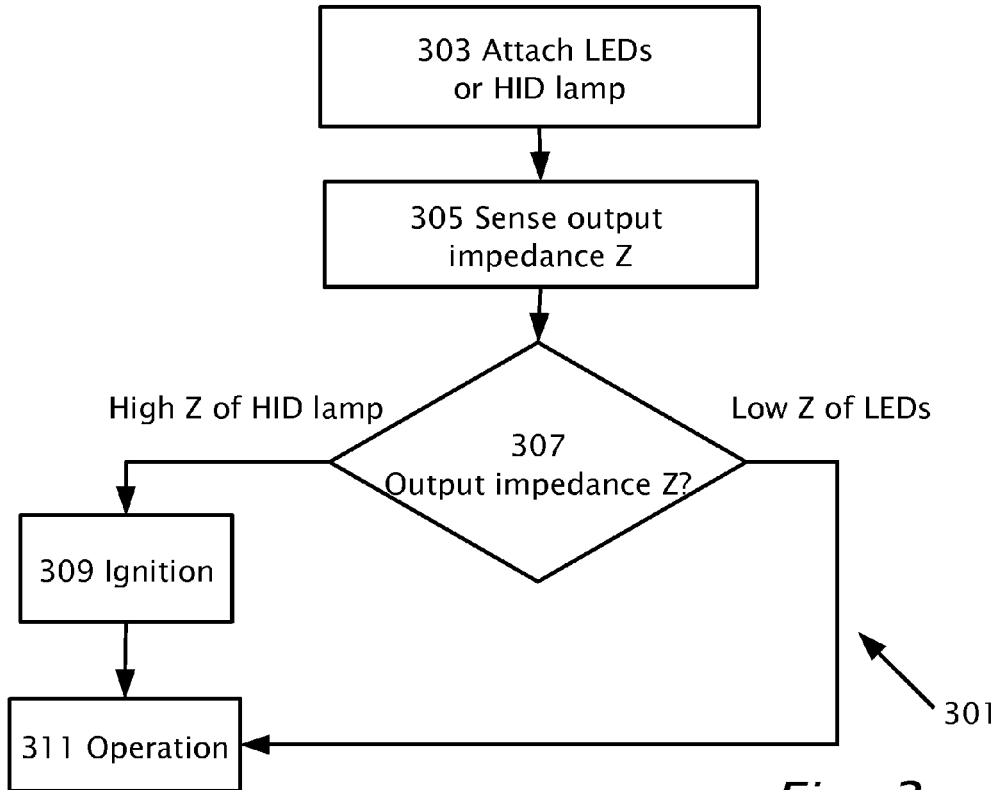
FIG. 3 shows a method according to an embodiment of the present invention, the method using the ballast of FIGS. 1 and 2.

Reference is now to FIG. 3 which shows a method 301 according to an embodiment of the present invention. Method 301 uses ballast 100 which is configured to operate HID lamp 112 as shown in FIG. 1. Typically a configuration of ballast 100 to operate HID lamp 112 involves details of an ignition pulse to be applied to lamp 112 and a maximum level of current to be supplied to lamp 112 during a normal mode of operation of HID lamp 112. The normal mode of operation of lamp 112 occurs after ignition during and after warm up of lamp 112. The nominal value of voltage (V) which appears across lamp 112 and the nominal level of current to be supplied to lamp 112 during the normal mode is used to determine the number of LEDs and their respective interconnections to form bank of LEDs 118.

A LED has a typical forward bias volt drop 3.2 volts, given that voltage (V) is sinusoidal for a high frequency balance or square wave for a low frequency ballast, the LEDs operate at 50% duty cycle. If it is desired to operate at 100% duty cycle a full wave rectifier may be inserted between the output of ballast 100 and the bank of LEDs.

As an example, the number (n) of LEDs needed to form a serial string if peak voltage of V=100 volts is given by:

$$n=(0.318 \cdot V)/\text{forward volt drop LED}=(0.318 \cdot 100)/3.2 \approx 100 \text{ LEDs}$$

Serial strings of LEDs may be connected in parallel to form the bank of LEDs 118. Typically, in order to insure current division among the serial strings of LEDs, a small resistive element is connected in series with each string. The maximum forward current of a serial string is used to determine the number of parallel connected strings to draw the maximum current (I) output of ballast 100.

Referring now to method 301 of FIG. 3, when bank of LEDs 118 is attached (step 303) to the output of ballast 100 as shown in FIG. 2, impedance sensor 110 for instance applies a current (I) and monitors (step 305) the voltage (V) across LEDs 118. The impedance or voltage value is conveyed to microprocessor 114 (as analog signal or digital data). Microprocessor 114 determines that a low impedance load (i.e. LEDs 118) (decision block 307) is connected to the output of ballast 100 and normal operation (step 311) of lighting using LEDs 118 controlled by microprocessor 114 continues without prior ignition which may damage LEDs 118. Normal operation (step 311) typically may involve using the initial impedance value and measured voltage (V) and/or current (I) in step 307 to determine the level of maximum current output (I) of ballast 100 to supply LEDs 118. Thereafter, normal operation (step 311) continues with LEDs 118 under output current control.

When a HID lamp 112 is attached (step 303) to the output of ballast 100 as shown in FIG. 1, sensor 110 monitors impedance (step 305) of HID lamp 112. The impedance (current and/or voltage) is conveyed to microprocessor 114. Microprocessor 114 determines that a high impedance load (i.e. non-ignited HID lamp 112) (step 307) is connected to the output of ballast 100. The ignition of HID lamp 112 is then performed in step 309. Once HID lamp 112 is ignited using ignition circuit 108, normal operation (step 311) of lighting using HID lamp 112 continues. Normal operation (step 311) typically involves allowing for HID lamp 112 to warm up so as to produce maximum intensity of light.

Figure 4A:
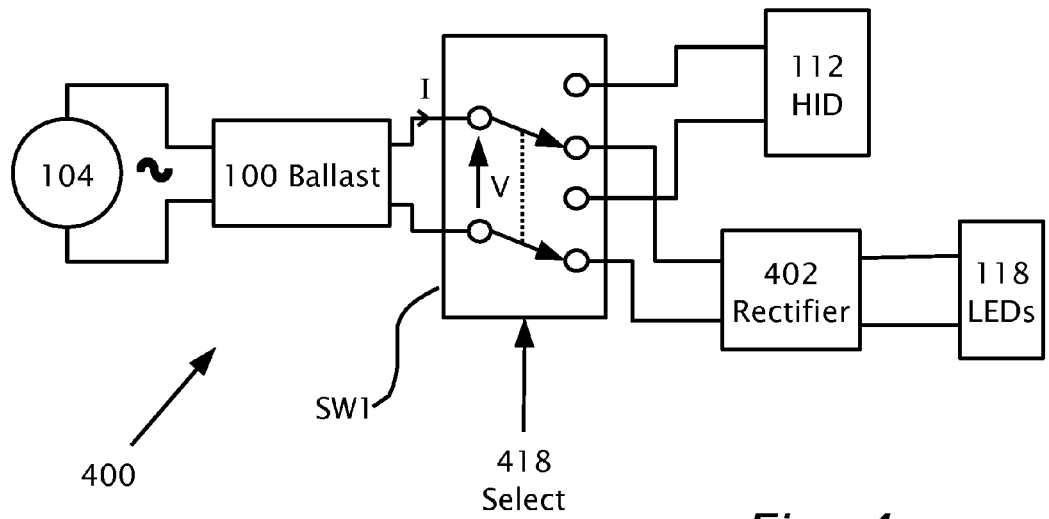
FIG. 4a shows a circuit according to an embodiment of the present invention for switching output of ballast between HID lamp and LEDs.

Reference is now made to FIG. 4a which shows a circuit 400 according to an embodiment of the present invention for switching output of ballast 100 between HID lamp 112 and LEDs 118. Alternating current (AC) mains supply 104 is connected to the input of ballast 100. The output of ballast 100 is connected to either the input of rectifier 402 or across HID lamp 112 using switch SW1. By way of example, switch SW1 includes two single pole double pole double throw (SPDT) switches which are mechanically linked together. Alternatively switch SW1 may have just one (SPDT) switch which is used to switch the live output of ballast 100 with the neutral output of ballast 100 connected to the neutral inputs of lamp 112 and rectifier 402. Switch SW1 may be activated/deactivated by input from an input select 418 to switch SW1 which may be used to manually select which of the two light sources HID 112 or LEDS 118 are to be powered. Alternatively, or in addition switch select 418 may be connected to select pin 118 of microprocessor 114.

Rectifier 402 is preferably a full wave rectifier which has an output connected to bank of LEDs 118. The use of rectifier 402 in circuit 400 makes serial strings of LEDs 118 active for the whole of period of voltage (V) and current (I) or 100% duty cycle.

Figure 4B:
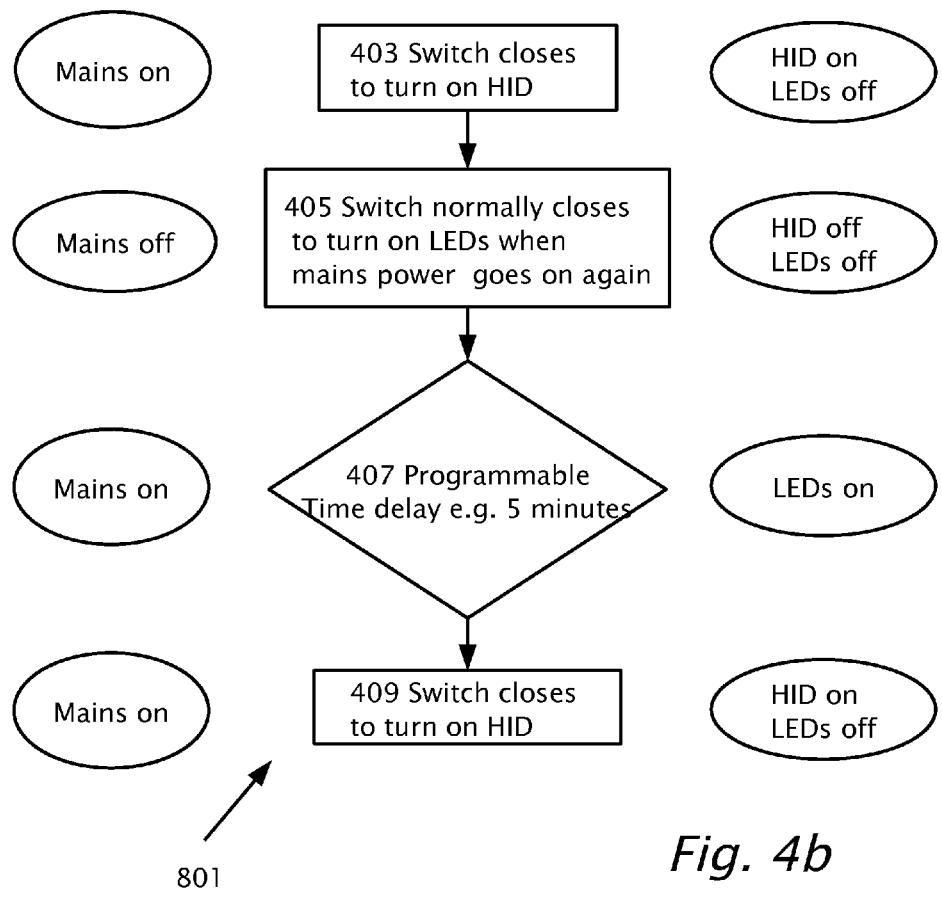

Reference is now made to FIG. 4b which shows a method 401 according to an embodiment of the present invention for providing emergency lighting using circuit 400. With mains 104 applied to ballast 100, switch SW1 applies the output of ballast 100 to the input of HID lamp 112 (step 403) and HID lamp 112 is ignited and turned on. Switch SW1 is controlled by microprocessor 114 via select line 418. When a power failure of mains 104 occurs or mains 104 is turned off, HID lamp 112 turns off also. Switch SW1 changes position (to its normal power-off position) and the output of ballast 100 is applied to the input of rectifier 402 (step 405). Once mains 104 is back on, LEDs 118 are now turned on and a previously programmed time delay of typically 5-10 minutes is initiated by microprocessor 114 (step 407). During the time delay, LEDs 118 are now on and HID lamp 112 cools down. After the time delay, switch SW1 changes position turning LEDs 118 off and applies the output of ballast 100 to the input of HID lamp 112. The output of ballast 100 applied to the input of HID lamp 112 ignites and turns on HID lamp 112 (step 409).

Figure 5:
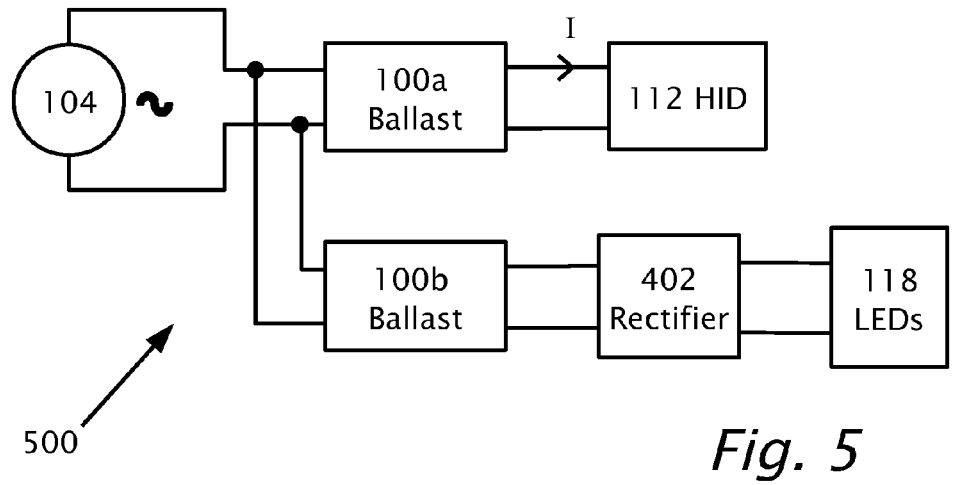
FIG. 5 shows a system according to another embodiment of the present invention, the system including multiple ballast circuits which power HID lamp and/or bank of LEDs both at the same time.

Reference is now made FIG. 5 which shows a system 500 according to another embodiment of the present invention. System 500 is includes multiple ballast circuits 100 which selectably power HID lamp 112 and/or bank of LEDs 118 both at the same time.

Alternating current (AC) supply 104 is connected across the input of identical ballasts 100a and 100b respectively. The output of ballast 100a is connected across HID lamp 112. The output of ballast 100b is connected across the input of rectifier 402. The output of rectifier 402 is connected across bank of LEDs 118. In system 500, when mains power turns off and immediately turns on again, LEDs 118 provide sufficient emergency light while HIDs are cooling and waiting for re-ignition. Ballasts 100a and 100b are fully identical and select pin 118 is not required.

Figure 6:
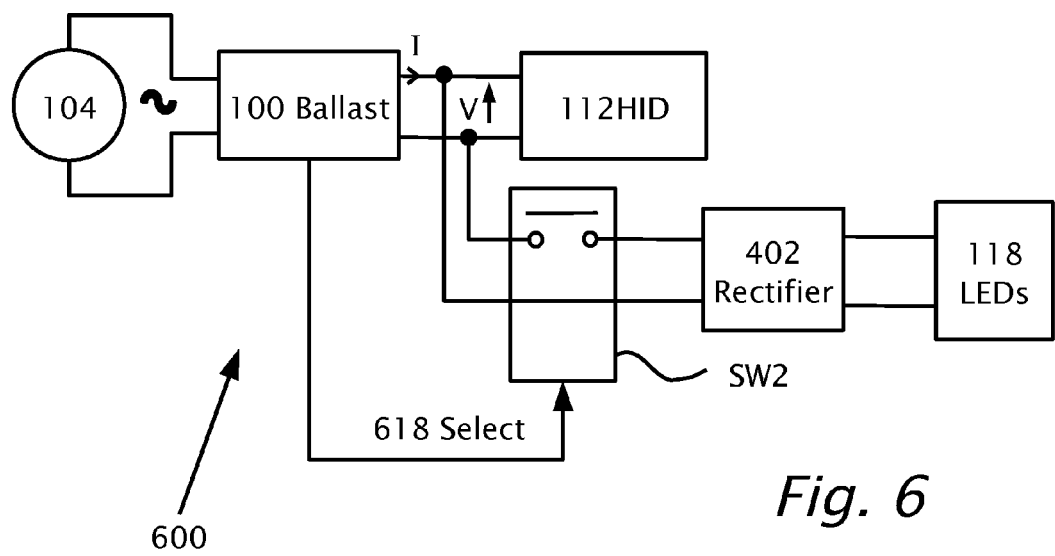
FIG. 6 shows a circuit according to another embodiment of the present invention for operating both HID lamp and LEDs simultaneously from a single ballast circuit of FIGS. 1 and 2.

Reference is now made FIG. 6 which shows a circuit 600 according to another embodiment of the present invention for operating both HID lamp 112 and LEDs 118 simultaneously from a single ballast circuit 100. AC supply 104 is connected across the input of ballast 100. The output of ballast 100 is connected either across HID lamp 112 and the input of rectifier 402 using switch SW2. Switch SW2 may be activated/deactivated by input select 618 provided by select output 118 of microprocessor 114. Switch SW2 has a single pole switch which connects the live output of ballast 100 to the live input of rectifier 402. The neutral output of ballast 100 connects directly to the neutral input of rectifier 402. The output of rectifier 402 is connected across bank of LEDs 118.

In the operation of circuit 600, SW2 is closed only after HID 112 is ignited. In this way, rectifier 402 and LEDs 118 are not exposed to high ignition voltage. Switch SW2 normally closes and connects LEDs 118 not under mains power. Ballast 100 tests output impedance and senses the high impedance of HID lamp 112. Ignition proceeds and switch SW2 closes and connects LEDs only after ignition. If mains power fails, then LEDs 118 are connected. Ignition is attempted only after a time delay after power on as in method 400 of FIG. 4a.

Figure 7A:
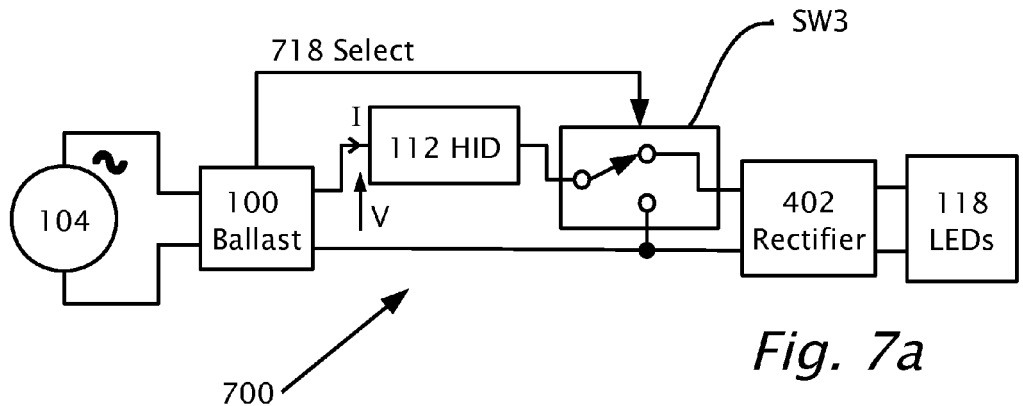
FIG. 7a shows a circuit according to yet another embodiment of the present invention for operating both HID lamp and LEDs simultaneously from a single ballast circuit of FIGS. 1 and 2.

Reference is now made FIG. 7a which shows a circuit 700 according to another embodiment of the present invention. AC mains supply 104 is connected across the input of ballasts 100. The live output of ballast 100 is connected to one side of HID lamp 112 and the other side of lamp 112 connecting to the common node of single pole double throw switch SW3. The neutral output of ballast 100 connects to one node of switch SW3 and the neutral input of rectifier 402. The other node of switch SW3 connecting to the live input of rectifier 402. Switch SW3 may be activated/deactivated by an input select 718 provided from microprocessor 114. The output of rectifier 402 is connected across bank of LEDs 118.

Figure 7B:
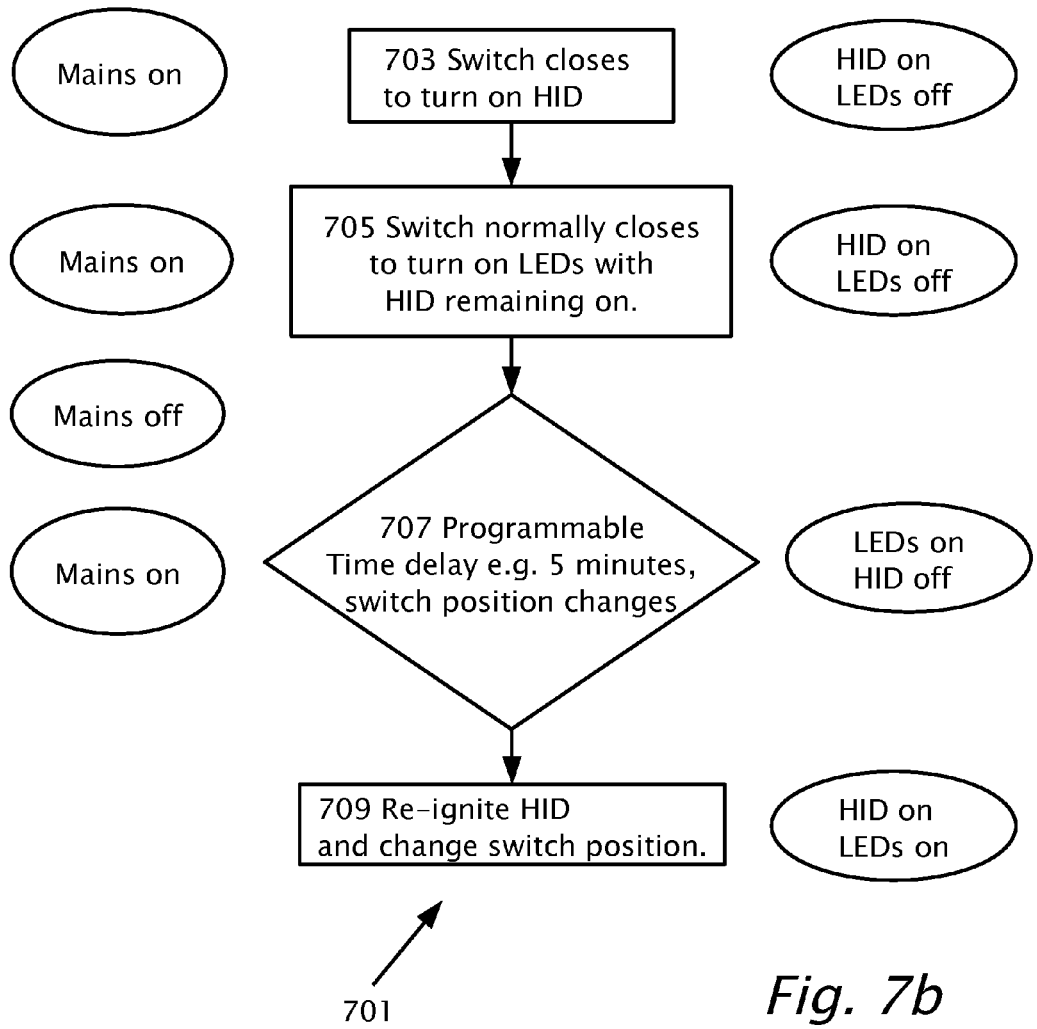

Reference is now made to FIG. 7b which shows a method 701 according to an embodiment of the present invention using circuit 700. With mains 104 applied to ballast 100 switch SW3 applies the output of ballast 100 across HID lamp 112 by virtue of one end of lamp 112 being applied to the neutral output of ballast 100. With one end of lamp 112 being applied to the neutral output of ballast 100 HID, lamp 112 is ignited and turned on (step 703). Switch SW3 is controlled by microprocessor 114 via select line 718. When SW3 changes position, HID lamp 112 remains on and LEDs 118 are turned on by virtue of HID lamp 112 being connected in series with LEDs 118 via rectifier 402 (step 705).

When a power failure of mains 104 occurs or mains 104 is turned off, HID lamp 112 and LEDs 118 turn off also and switch SW3 changes position. Once mains 104 is back on, a time delay of typically 5-10 minutes is initiated by microprocessor 114 (step 707). During the time delay, LEDs 118 are on and HID lamp 112 is off and cools down. After the time delay HID lamp 112 is re-ignited and once again switch SW3 changes position which turns LEDs 118 on by virtue of HID lamp 112 being connected in series with LEDs 118 via rectifier 402 (step 709).

Figure 8:
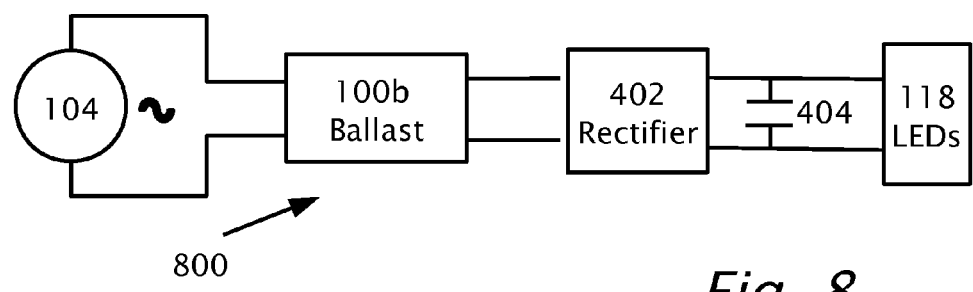
FIG. 8 shows yet another embodiment of a circuit, according to the present invention.

Reference is now made to FIG. 8 which illustrates a circuit 800, according to an embodiment of the present invention. FIG. 1 shows a ballast circuit 100 with an input connected to an alternating current (AC) mains power 104 and an output connected to a rectifier 402 which is typically a full-wave bridge rectifier. The DC output from rectifier is filtered by a parallel-connected capacitor 404 of typically low capacitance. Rectifier 402 has an output connected to bank of LEDs 118. During operation of circuit 800, if the energy of the ignition pulse is sufficiently small, capacitor 404 may protect LEDs 118 from being damaged by the ignition pulse.

The definite articles "a", "an" is used herein, such as "a LED", "a switch" have the meaning of "one or more" that is "one or more LEDs" or "one or more switches".

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

I claim:

1. A lighting system comprising:
   an electronic ballast circuit having a current output configured to operate a high intensity discharge (HID) lamp or a plurality of light emitting diodes (LEDs);
   wherein said electronic ballast circuit includes:
   an impedance sensor adapted to sense impedance of said current output; and
   an ignition circuit configured to ignite said HID lamp, wherein said ignition circuit is activated only when said impedance is characteristic of said HID lamp and not characteristic of said LEDs, wherein responsive to said impedance either said HID lamp or said LEDs are selected for drawing current from said electronic ballast circuit.

2. The lighting system of claim 1, further comprising:
   a second electronic ballast configured to operate a second high intensity discharge (HID) lamp, wherein said second electronic ballast shares an input of mains power with said electronic ballast; wherein after momentary failure of said mains power, said LEDs are adapted to provide emergency lighting while said second high intensity discharge lamp (HID) is cooling down.

3. The lighting system of claim 1, further comprising:
   a switch operatively connected to the electronic ballast, said HID lamp and said LEDs, wherein said switch selects either said HID lamp or said LEDs for drawing current from said electronic ballast circuit.

4. The lighting system of claim 3, wherein said ballast circuit is controlled by a microprocessor and wherein said microprocessor has an output configured to control said switch.

5. The lighting system of claim 1, further comprising:
   a switch operatively connected to the electronic ballast, said HID lamp and said LEDs, wherein said switch is configured to select said LEDs for drawing current from said current output of said electronic ballast when said HID lamp is not operable.

6. The lighting system of claim 1, further comprising:
   a switch operatively connected to the electronic ballast, said HID lamp and said LEDs, wherein said switch is configured to select said LEDs for drawing current from said current output of said electronic ballast circuit when said HID lamp is not operable.

7. The lighting system of claim 1, wherein said HID lamp and said LEDs are driven simultaneously by said current output of said electronic ballast circuit.

8. A method for using an electronic ballast circuit having a current output configured to operate a high intensity discharge (HID) lamp, the method comprising:
   instead of attaching said HID lamp to the current output, attaching a plurality of light emitting diodes (LEDs) to the current output of the electronic ballast circuit;
   sensing impedance of the current output; and only upon detecting an impedance significantly lower than an impedance characteristic of the HID lamp, driving current from said current output through said LEDs to light said LEDs.

9. The method of claim 8, further comprising:
providing a signal for disconnecting said LEDs during a high voltage output for ignition of the high intensity discharge (HID) lamp.

10. The method of claim 8, wherein said driving current through said LEDs is performed without a prior high voltage ignition.

11. The method of claim 8, further comprising:
attaching a rectifier and a parallel-connected capacitor disposed between the current output and said LEDs, whereby said capacitor is adapted to protect said LEDs from being damaged by an ignition pulse intended to ignite the HID lamp.

12. An electronic ballast circuit having a current output configured to operate a high intensity discharge (HID) lamp or a plurality of light emitting diodes (LEDS), said electronic ballast circuit comprising:
an ignition circuit for providing an ignition pulse to ignite the HID lamp;
an inverter circuit for providing current to the HID lamp; and
an impedance sensor on the current output, wherein said impedance sensor is configured to sense an impedance of the current output and wherein said ignition circuit is activated only when said impedance is characteristic of said HID lamp and not characteristic of said LEDs.

13. The electronic ballast of claim 12, further comprising:
a microprocessor for controlling the electronic ballast, wherein said microprocessor includes a signal output adapted to disconnect said LEDs from the current output during said ignition pulse and to connect said LEDs to the current output only while said inverter circuit is providing current from said inverter circuit.

14. The electronic ballast of claim 12, further comprising:
a switch operatively connected to said HID lamp and said LEDs, wherein said switch is configured to select said LEDs for drawing current from the current output, when said HID lamp is not operable during a time period after a momentary failure of mains electrical power.

15. The electronic ballast of claim 12, further comprising:
a rectifier disposed between the current output and said LEDs to provide a direct current (DC) output; and a parallel-connected capacitor disposed between said DC output and said LEDs.

* * * * *